(12) United States Patent
Meis et al.

(10) Patent No.: US 9,612,163 B2
(45) Date of Patent: Apr. 4, 2017

(54) METHODS AND APPARATUS FOR DETECTING ICE FORMATION ON AIRCRAFT

(71) Applicant: The Boeing Company, Seal Beach, CA (US)

(72) Inventors: Charles S. Meis, Renton, WA (US); Todd J. Germeroth, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 607 days.

(21) Appl. No.: 14/050,978

(22) Filed: Oct. 10, 2013

(65) Prior Publication Data

US 2015/0103867 A1    Apr. 16, 2015

(51) Int. Cl.
*G01K 7/00*      (2006.01)
*B64D 15/20*    (2006.01)
*G01K 13/04*    (2006.01)

(52) U.S. Cl.
CPC .............. *G01K 7/003* (2013.01); *B64D 15/20* (2013.01); *G01K 13/04* (2013.01)

(58) Field of Classification Search
None
See application file for complete search history.

(56) References Cited

U.S. PATENT DOCUMENTS

| 4,570,881 | A |   | 2/1986  | Lustenberger |            |
|-----------|---|---|---------|--------------|------------|
| 5,678,145 | A | * | 10/1997 | Snelling     | G03G 15/1685 |
|           |   |   |         |              | 347/114 |
| 6,320,511 | B1 |   | 11/2001 | Cronin |  |
| 6,402,093 | B1 | * | 6/2002 | Wang | B64D 15/00 |
|           |   |   |         |              | 244/134 A |
| 6,576,922 | B1 | * | 6/2003 | Ma | H01L 22/34 |
|           |   |   |         |              | 257/429 |

FOREIGN PATENT DOCUMENTS

| DE | 102012208653 | 11/2012 |
| GB | 1582673      | 1/1981  |

OTHER PUBLICATIONS

European Search Report dated Mar. 15, 2011 for Application No. 14181926.8-1754, 6 pages.
14 CFR Ch. I (Jan. 1, 2012 Edition) Pt. 25, App. C, pp. 544-551.
Ehre et al., "Water Freezes Differently on Positively and Negatively Charged Surfaces of Pyroelectric Materials," Copyright 2010, Science, vol. 327, pp. 672-675.

(Continued)

*Primary Examiner* — Erica Lin
(74) *Attorney, Agent, or Firm* — Smith Moore Leatherwood LLP (57) ABSTRACT

In one aspect, methods of detecting ice formation on an aircraft are described herein. In some implementations, a method of detecting ice formation on an aircraft comprises disposing an ice detector on an exterior surface of the aircraft, the ice detector comprising a probe surface and a pyroelectric material layer disposed on at least a portion of the probe surface. The method further comprises generating a charge on a surface of the pyroelectric material layer of the ice detector to increase the local freezing point of water on the surface of the pyroelectric material layer.

20 Claims, 9 Drawing Sheets

(56) References Cited

OTHER PUBLICATIONS

Ehre et al., "Water Freezes Differently on Positively and Negatively Charged Surfaces of Pyroelectric Materials," Supporting Information, Copyright 2010, Science, vol. 327, 3 pages.
Lang, "Pyroelectricity: From Ancient Curiosity to Modern Imaging Tool," Copyright 2005, Physics Today, Aug. 2005, pp. 31-36.
Canadian Office Action dated Aug. 23, 2016 for Canadian Patent Application No. 2,857,891 (4 pages).

* cited by examiner

METHODS AND APPARATUS FOR DETECTING ICE FORMATION ON AIRCRAFT

FIELD

This disclosure relates to methods and apparatus for detecting ice formation on aircraft and, in particular, to ice detectors comprising a pyroelectric material.

BACKGROUND

The accumulation of ice on critical flight surfaces of aircraft presents a substantial safety risk. Even a small amount of ice accumulation on some critical surfaces, such as the leading edges of aircraft wings and other airfoil surfaces, can significantly affect the surfaces' lift and drag characteristics. Therefore, the real-time detection of aircraft icing is an important factor for flight safety. However, some existing systems and methods of real-time ice detection are susceptible to false negative readings. In such cases, an ice detection system can incorrectly indicate that there is no ice accumulation on the aircraft even though ice accumulation on one or more critical flight surfaces has in fact occurred. False negative readings can be particularly common when flying an aircraft at a temperature near the freezing point of water, such as about 27-32° F., and an altitude of about 1500-13,000 feet. Under such conditions, ice can form on the leading edge of an aircraft's wing or another critical flight surface prior to ice formation on an ice detector disposed in a typical location on the aircraft, such as on the forward fuselage section of the aircraft.

Therefore, there exists a need for methods and apparatus for detecting icing conditions and/or ice formation on an aircraft in a more reliable manner and/or under a wider array of atmospheric conditions.

SUMMARY

In one aspect, apparatus comprising ice detectors are described herein which, in some implementations, may provide one or more advantages over previous ice detectors. For example, in some cases, an ice detector described herein can detect ice formation on an aircraft surface under atmospheric conditions at which other ice detectors cannot detect ice formation on the aircraft surface. Further, in some implementations, an ice detector described herein can detect ice formation at any temperature, pressure, and moisture level included in an icing envelope described by 14 CFR 25, Appendix C (1-1-12 Edition). Therefore, in some cases, an ice detector described herein can provide early detection of ice formation on a critical flight surface of the aircraft, thereby reducing the likelihood of a hazardous false negative reading. In addition, an ice detector described herein can achieve one or more of the foregoing advantages without the need for a substantial redesign or retrofit of the aircraft. For example, in some implementations, an ice detector described herein can be coupled to an aircraft without substantially perturbing the aircraft's aerodynamic properties. In some cases, an ice detector described herein can be coupled to the exterior surface or skin of the front fuselage section of the aircraft, including in place of an existing ice detector disposed in this location. Therefore, in some implementations, an ice detector described herein can be used to retrofit an aircraft such as a commercial jetliner or other airplane in a cost effective and/or efficient manner.

An ice detector described herein, in some implementations, comprises a probe surface and a pyroelectric material layer disposed on at least a portion of the probe surface. In some cases, the pyroelectric material layer is directly disposed on the probe surface. In other instances, one or more additional layers are disposed between the probe surface and the pyroelectric material layer. For example, in some implementations, an ice detector described herein further comprises an adhesive material layer disposed between the probe surface and the pyroelectric material layer.

The probe surface of an ice detector described herein, in some cases, is a vibrating probe surface such as an ultrasonic probe surface. In some implementations, the probe surface is part of a magnetostrictive detector architecture. In other cases, the probe surface forms part of an optical detector architecture, piezoelectric detector architecture, or capacitance detector architecture.

The pyroelectric material layer of an ice detector described herein, in some implementations, is a crystalline layer. In other instances, the pyroelectric material layer is a quasi-amorphous layer. Moreover, the pyroelectric material layer of an ice detector described herein can be a substantially continuous layer or a tiled layer. Further, in some implementations, a pyroelectric material layer of an ice detector described herein can comprise or be formed from an inorganic material such as a ceramic material, an organic material such as a polymeric material, or a combination thereof. Additionally, in some cases, a surface of the pyroelectric material layer of an ice detector described herein exhibits a local freezing point of water that is greater than the local freezing point of water exhibited by the probe surface of the ice detector under the same conditions. Further, the water can be supercooled liquid water.

In another aspect, methods of detecting ice formation on an aircraft are described herein which, in some implementations, may provide one or more advantages over some prior methods. In some cases, for example, a method described herein can be used to detect the formation of ice on a non-critical surface of the aircraft prior to the formation of ice on a critical flight surface of the aircraft, thereby reducing the likelihood of a false negative reading. In some implementations, a method described herein can be used to provide an early warning of the presence of potentially hazardous flight conditions, such as conditions within an icing envelope described by 14 CFR 25, Appendix C (1-1-12 Edition).

A method of detecting ice formation on an aircraft, in some implementations described herein, comprises disposing an ice detector described herein on an exterior surface of the aircraft and generating a charge on a surface of the pyroelectric material layer of the ice detector to alter the local freezing point of water on the surface of the pyroelectric material layer. In some cases, the local freezing point of water on the surface of the pyroelectric material layer is increased. It is also possible, in other instances, to lower the local freezing point of water on the surface of the pyroelectric material layer. Moreover, the water can be supercooled liquid water.

In addition, in some implementations, a method described herein further comprises providing a signal in response to the formation of ice on the surface of the pyroelectric material layer of the ice detector. Further, in some cases, the local freezing point of water on the surface of the pyroelectric material layer is greater than the local freezing point of water on one or more flight surfaces of the aircraft. For example, in some instances, the local freezing point of water on the surface of the pyroelectric material layer is greater than the local freezing point of water on a wing leading edge, an empennage leading edge, or an engine inlet leading edge of the aircraft. Thus, in some implementations, a method described herein can be used to identify the presence of icing conditions prior to the formation of ice on one or more critical flight surfaces, including in real-time while the aircraft is in flight.

These and other implementations are described in greater detail in the detailed description which follows.

DETAILED DESCRIPTION

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In one aspect, ice detectors are described herein. Ice detectors described herein can be used to detect the presence or absence of ice formation on an aircraft, including an aircraft in flight. In general, ice from two different sources can be present on or near an aircraft in flight, particularly during flight in or near a cloud. One type of ice consists of ice formed by an "icing" process wherein supercooled liquid water nucleates or condenses on an aircraft surface and then freezes on the aircraft surface. The nucleation or condensation of the supercooled liquid water can immediately precede or occur substantially simultaneously with the freezing process. Additionally, the supercooled liquid water can be supercooled liquid water present in or near a cloud. A second type of ice that can be present on or near an aircraft in flight consists of ice that already exists in the aircraft's external environment as solid ice. For example, this type of ice can be present in or near a cloud as suspended ice particles or ice crystals. Ice detectors described herein can be used particularly to detect the presence or absence of ice deposited on an aircraft surface by an icing process described above, as opposed to ice that may be present as suspended ice particles. For example, in some implementations, ice detectors described herein are so-called "accretion" or "accumulation"-type ice detectors operable to detect the accumulation of ice due to one or more icing events. However, ice detectors described herein are not limited to ice accretion or ice accumulation detectors. Instead, ice detectors described herein can also comprise other detector architectures or structures. An ice detector described herein can include any ice detection structure not inconsistent with the objectives of the present disclosure, as described further hereinbelow.

Figure 1:
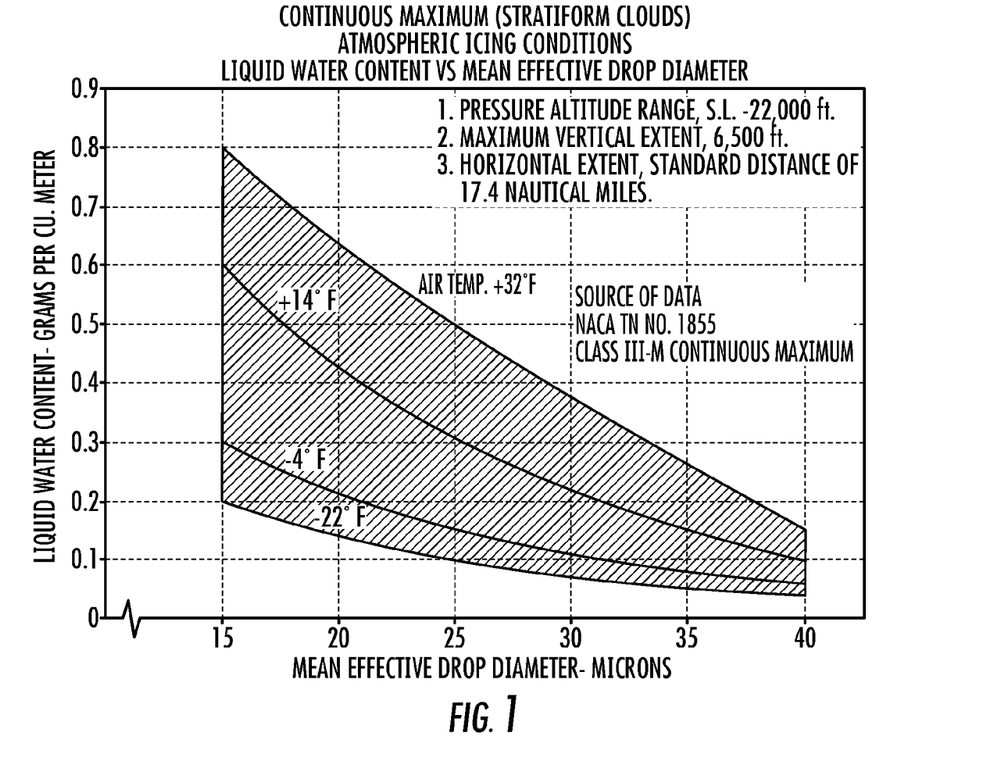
FIG. 1 illustrates a plot of icing conditions that can be encountered by an ice detector according to some implementations described herein.
Figure 2:
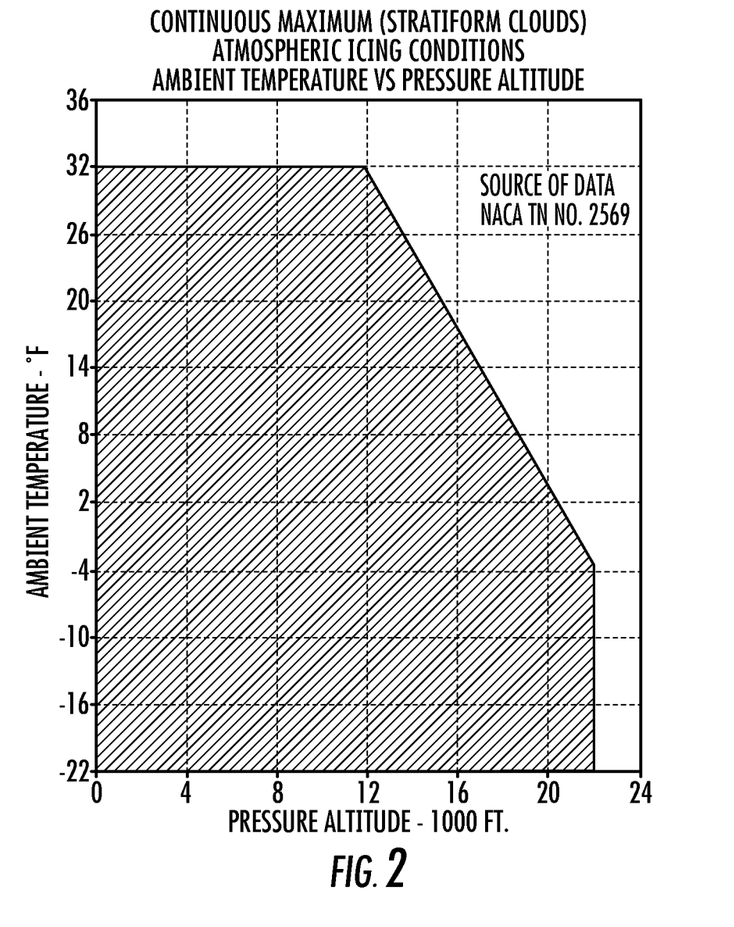
FIG. 2 illustrates a plot of an icing envelope that can be encountered by an ice detector according to some implementations described herein.
Figure 3:
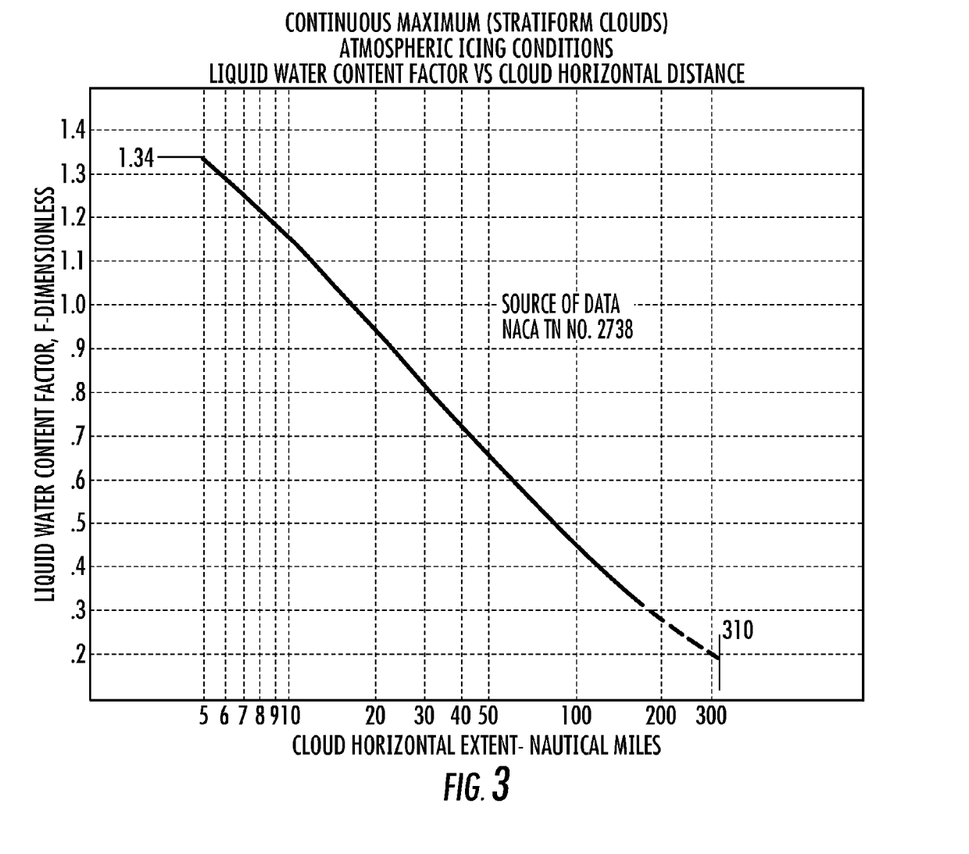
FIG. 3 illustrates a plot of icing conditions that can be encountered by an ice detector according to some implementations described herein.

The accumulation of ice through an icing process can be of particular importance when an aircraft is operated in conditions described by 14 CFR 25, Appendix C (hereinafter, "Appendix C icing conditions" or "Appendix C icing envelopes"). Such Appendix C icing conditions or icing envelopes can include "continuous maximum icing" conditions, "intermittent maximum icing" conditions, or "takeoff maximum icing" conditions. "Continuous maximum icing" refers to the maximum continuous intensity of atmospheric icing conditions and is defined by the variables of the cloud liquid water content, the mean effective diameter of the cloud droplets, the ambient air temperature, and the interrelationship of these three variables, as shown in FIG. 1, which corresponds to a figure published in Appendix C. As described by Appendix C, the limiting icing envelope in terms of altitude and temperature is given in FIG. 2. The interrelationship of cloud liquid water content with drop diameter and altitude is determined from FIGS. 1 and 2. The cloud liquid water content for continuous maximum icing conditions of a horizontal extent (other than 17.4 nautical miles) is determined by the value of the liquid water content of FIG. 1, multiplied by the appropriate factor from FIG. 3. FIGS. 2 and 3 also correspond to figures published in Appendix C.

Figure 4:
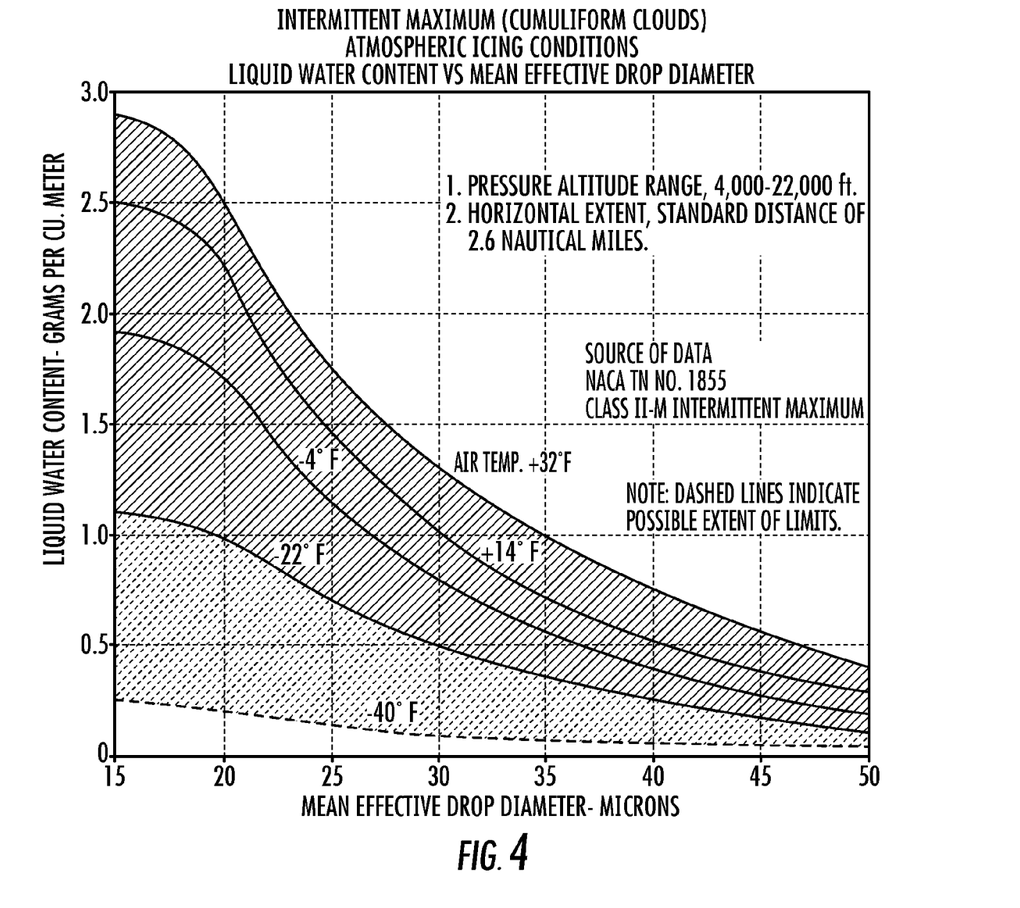
FIG. 4 illustrates a plot of icing conditions that can be encountered by an ice detector according to some implementations described herein.
Figure 5:
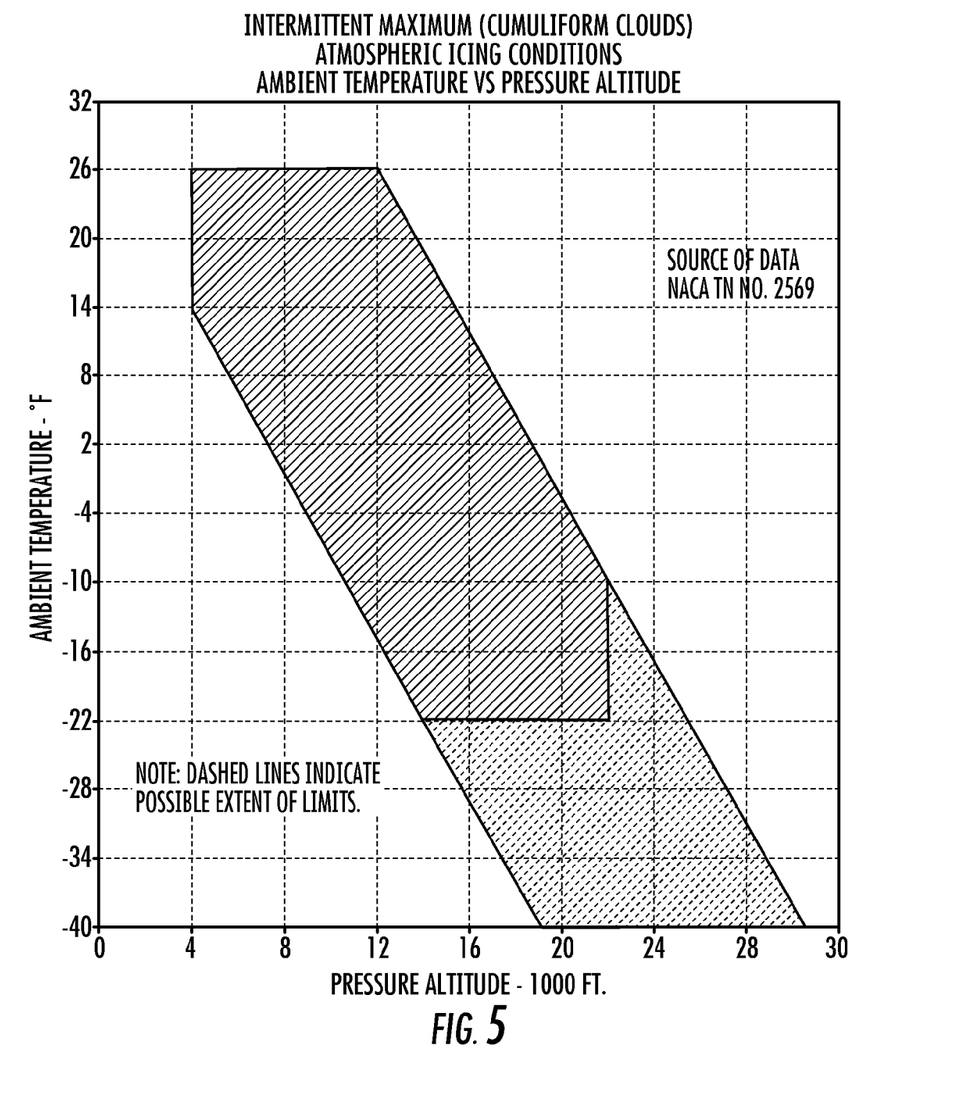
FIG. 5 illustrates a plot of an icing envelope that can be encountered by an ice detector according to some implementations described herein.
Figure 6:
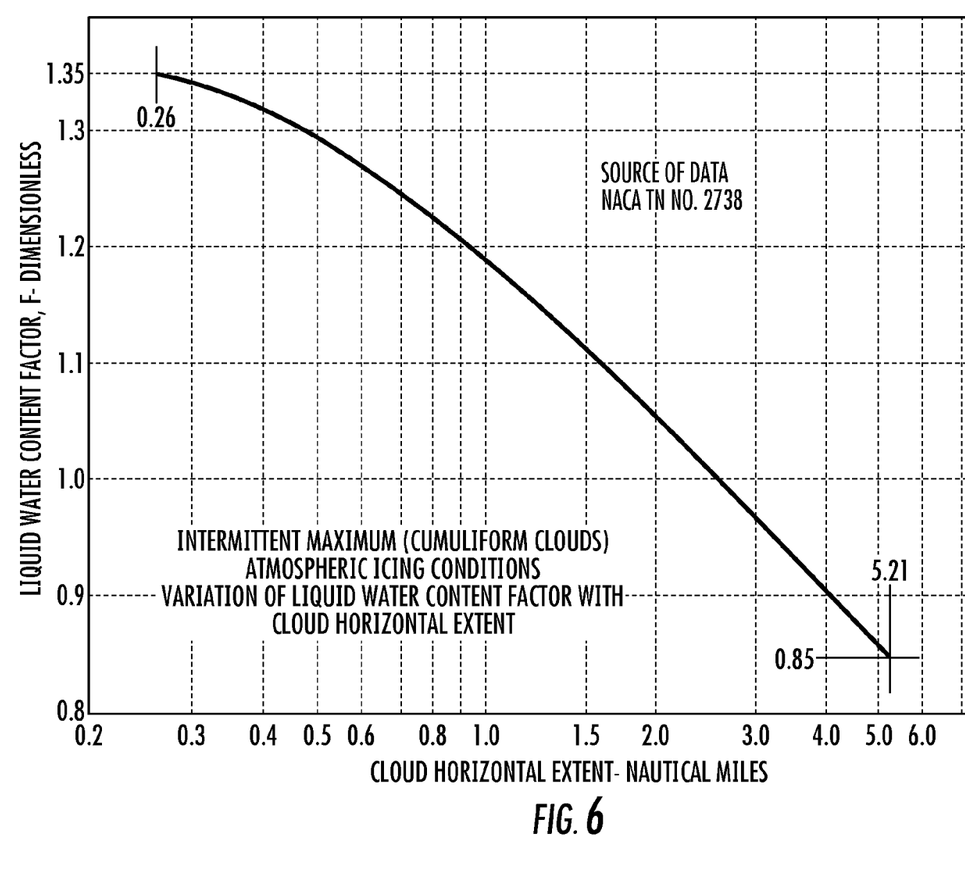
FIG. 6 illustrates a plot of icing conditions that can be encountered by an ice detector according to some implementations described herein.

As described by Appendix C, "intermittent maximum icing" refers to the intermittent maximum intensity of atmospheric icing conditions and is defined by the variables of the cloud liquid water content, the mean effective diameter of the cloud droplets, the ambient air temperature, and the interrelationship of these three variables, as shown in FIG. 4, which corresponds to a figure published in Appendix C. The limiting icing envelope in terms of altitude and temperature is given in FIG. 5. The interrelationship of cloud liquid water content with drop diameter and altitude is determined from FIGS. 4 and 5. The cloud liquid water content for intermittent maximum icing conditions of a horizontal extent (other than 2.6 nautical miles) is determined by the value of the cloud liquid water content of FIG. 4 multiplied by the appropriate factor in FIG. 6. Again, FIGS. 5 and 6 also correspond to figures published in Appendix C.

As described by Appendix C, "takeoff maximum icing" refers to the maximum intensity of atmospheric icing conditions for takeoff and is defined by the cloud liquid water content of 0.35 g/m$^3$, the mean effective diameter of the cloud droplets of 20 microns (μm), and the ambient air temperature at ground level minus 9 degrees. The takeoff maximum icing conditions extend from ground level to a height of 1500 feet above the level of the takeoff surface.

Figure 7:
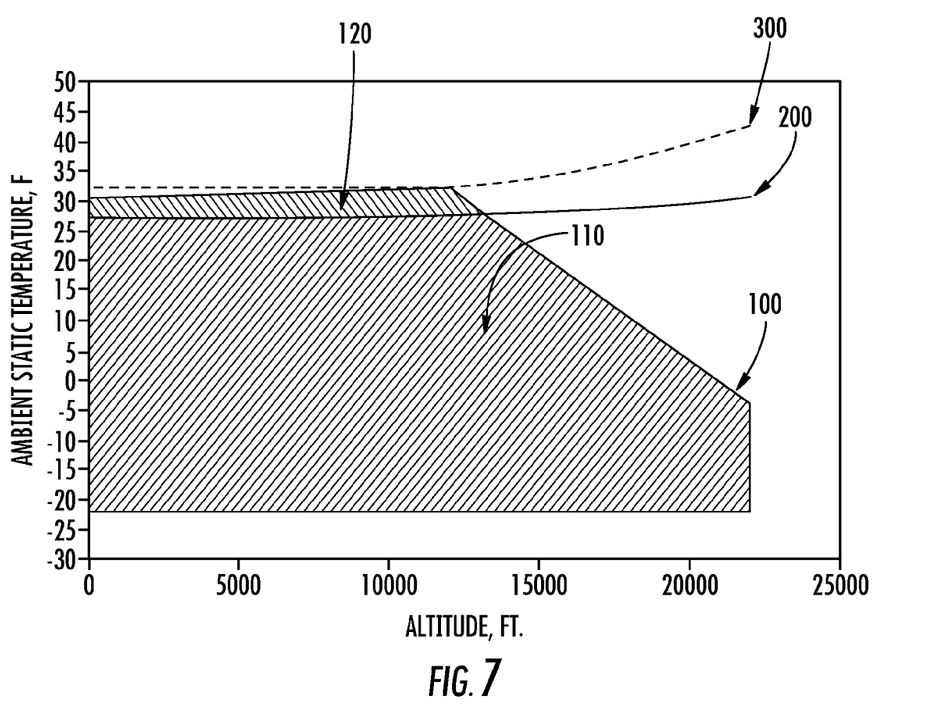
FIG. 7 illustrates a plot of an icing envelope that can be encountered by an ice detector according to some implementations described herein.

One objective of the present disclosure is to provide ice detectors that, in some implementations, can more accurately detect the presence or absence of an icing event on an aircraft, including when the aircraft is operated in Appendix C icing conditions or Appendix C icing envelopes, including those described in FIGS. 1-6. As described further hereinabove, some prior ice detectors provide false negative readings under some Appendix C icing conditions or icing envelopes, particularly when the ice detector is positioned on or near the forward fuselage of the aircraft. For example, FIG. 7 illustrates some conditions within an Appendix C icing envelope in which ice can form on a wing leading edge of an aircraft prior to ice forming on a prior art ice detector positioned on the forward fuselage of the aircraft (and thus prior to detection of ice by the prior art ice detector). The plot of FIG. 7 assumes that the prior art ice detector is a magnetostrictive accretion-type ice detector such as a Goodrich 0781LH1 ice detector.

As illustrated in FIG. 7, icing envelope (100) is defined in terms of altitude and temperature. The solid line (200) marks the conditions above which ice will not form on a prior art accretion-type ice detector positioned at the forward fuselage of an aircraft in flight. Below the solid line (200), ice will form on the prior art ice detector, and the prior art ice detector will properly detect an icing event, giving a "true positive" reading. Thus, solid line (200) defines a true positive detection region (110) within the icing envelope (100).

The dashed line (300) in FIG. 7 marks the conditions above which ice will not form on the leading edge of a typical wing of an aircraft, such as an aircraft's mid/inboard wing leading edge. Below the dashed line (300), ice will form on the wing leading edge. Therefore, the solid line (200) and the dashed line (300) define a false negative detection region (120) within the icing envelope (100) in which a prior art ice detector positioned at the forward fuselage of the aircraft will incorrectly indicate the absence of an icing event on the wing leading edge. In contrast to some existing ice detectors, ice detectors described herein, in some implementations, can avoid false negative readings in at least a portion of the false negative detection region (120) of FIG. 7, thereby improving aviation safety. Such performance improvement can be provided by the apparatus and methods described further hereinbelow.

In some implementations, an ice detector described herein comprises a probe surface and a pyroelectric material layer disposed on at least a portion of the probe surface. In some cases, the pyroelectric material layer is directly disposed on the probe surface. In other instances, one or more additional layers are disposed between the probe surface and the pyroelectric material layer. For example, in some implementations, an ice detector described herein further comprises an adhesive material layer disposed between the probe surface and the pyroelectric material layer.

Turning now to specific components of ice detectors, ice detectors described herein comprise a probe surface. The probe surface can be an exterior surface of the probe and can be configured to detect the nucleation or formation of ice on a surface of the ice detector in any manner not inconsistent with the objectives of the present disclosure. In addition, the probe surface can be incorporated into the ice detector in any manner known to one of ordinary skill in the art. For example, in some implementations, the probe surface of an ice detector described herein is a vibrating probe surface such as the surface of an ultrasonic probe. In some instances, the probe surface is part of a magnetostrictive detector architecture. As understood by one of ordinary skill in the art, a magnetostrictive detector architecture can include an ultrasonic vibrating probe, such as a probe formed by a hollow tube. The vibrating probe can be coupled to a magnetostrictive material. When ice accumulates on the probe surface, the resonant frequency of the probe is reduced according to the mass of accumulated ice. Reduction of the probe frequency below a predetermined threshold frequency can result in a signal that an icing event has occurred. Such a configuration is illustrated, for instance, in FIG. 8.

Figure 8:
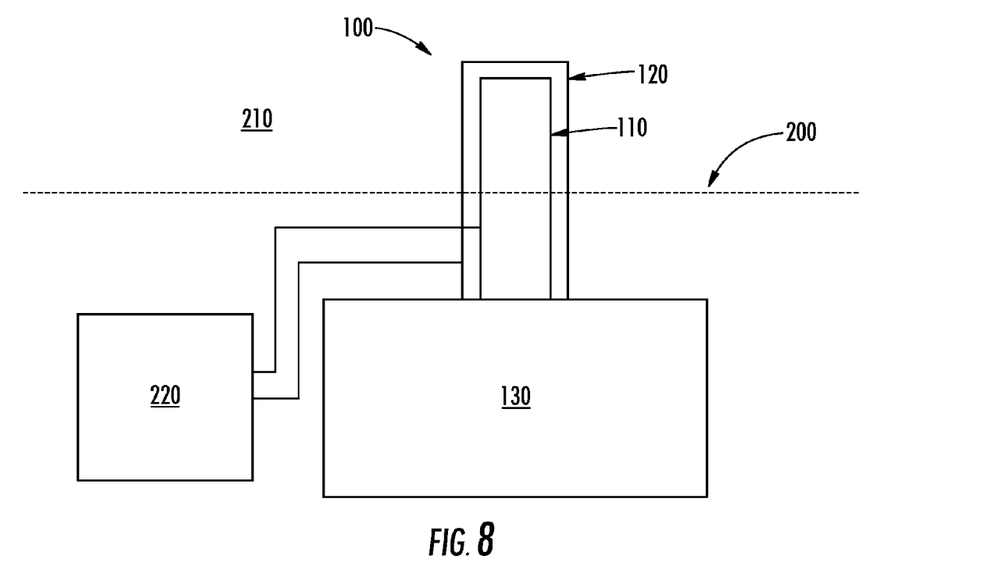
FIG. 8 illustrates a sectional view of an ice detector according to one implementation described herein.

As illustrated in FIG. 8, an ice detector (100) comprises a probe surface (110). The probe surface (110) is an ultrasonic vibrating probe surface, such as used in a magnetostrictive ice detector architecture. A pyroelectric material layer (120) is disposed on the probe surface (110). The ice detector (100) also comprises a controller (130). The controller (130) can include circuitry or hardware and/or software configured to receive, transmit, and/or process data corresponding to an icing event. In addition, the ice detector (100) is coupled to an aircraft surface (200) such that a portion of the probe surface (110) is disposed in an exterior environment (210) of the aircraft. The exterior environment (210) can be considered to be a potential icing environment. A power supply (220) of the aircraft can provide power and/or a charge to the probe surface (110) and/or the controller (130).

In other cases, a probe surface described herein forms part of a capacitor detector architecture, such as in a capacitance probe. As understood by one of ordinary skill in the art, a capacitance probe architecture can include spatially separated conductive electrodes encapsulated in a non-conductive substrate to form a probe, where the amount of ice accumulated on the probe surface changes the capacitance of the probe, which can be measured by a capacitance measuring circuit.

In some implementations, the probe surface of an ice detector described herein is part of an optical detector architecture. For example, in some instances, the probe surface is formed from a material (such as a metal, semiconductor, glass, or polymer) on which ice can form and accumulate, and a modulated light source is directed toward the probe surface. To detect an icing event using such a structure, the light source can direct light toward the probe surface, and the probe surface can then transmit the light to an optical detector. The amount of light transmitted to the optical detector can indicate the amount of ice present on the probe surface.

In still other instances, the probe surface of an ice detector described herein is a temperature-controlled or heated surface that can form part of an ice detector architecture based on the melting time of accumulated ice. In such an architecture, the detector can operate periodically by heating the probe surface to a constant temperature. A microprocessor can measure the probe surface's rate of temperature increase by comparing the time it takes the probe surface to pass through two or more reference temperatures. The amount of accumulated ice can then be determined based on the rate of temperature increase, where the temperature increases at a slower rate when more ice has accumulated.

Moreover, the probe surface of an ice detector described herein, in some implementations, can have one or more electrical properties suitable for use with a pyroelectric material layer described herein. For example, in some cases, the probe surface is electrically conductive and/or thermally insulating. In some instances, the probe surface exhibits an electrical conductivity of at least about $1.0 \times 10^{-3}$ siemens per meter (S/m) at 20° C. or at least about $1.5 \times 10^{-3}$ S/m at 20° C. In addition, in some implementations, the probe surface of an ice detector described herein exhibits a thermal diffusivity of no greater than about $10 \times 10^{-3}$ cm$^2$/sec or no greater than about $5 \times 10^{-3}$ cm$^2$/sec.

Ice detectors described herein also comprise a pyroelectric material layer disposed on at least a portion of a probe surface described herein. The pyroelectric material layer can be disposed on any portion of the probe surface not inconsistent with the objectives of the present disclosure. In some cases, for example, the pyroelectric material layer covers all or a majority of the surface area of the probe surface. In some implementations, the pyroelectric material layer covers all or a majority of the surface area of the probe surface that is exposed to atmospheric conditions, such as the atmospheric conditions experience by the exterior of an aircraft. Therefore, in some implementations, an ice detector described herein is operable to detect the nucleation or formation of ice on the pyroelectric material layer of the ice detector, including by means of an ice detector architecture described hereinabove.

In some instances, the pyroelectric material layer of an ice detector described herein is disposed on up to about 99 percent, up to about 95 percent, up to about 90 percent, up to about 80 percent, up to about 70 percent, up to about 60 percent, up to about 50 percent, up to about 40 percent, up to about 30 percent, up to about 20 percent, or up to about 10 percent of the surface area of the probe surface or of the portion of the probe surface that is exposed to external atmospheric conditions. In some implementations, the pyroelectric material layer of an ice detector described herein is disposed on about 10 percent to about 99 percent, about 20 percent to about 90 percent, about 30 percent to about 80 percent, about 40 percent to about 99 percent, about 50 percent to about 99 percent, about 60 percent to about 99 percent, about 70 percent to about 99 percent, about 70 percent to about 95 percent, about 80 percent to about 95 percent, about 80 percent to about 99 percent, or about 90 percent to about 99 percent of the surface area of the probe surface or of the portion of the probe surface that is exposed to external atmospheric conditions.

Additionally, the pyroelectric material layer of an ice detector described herein can have any structure not inconsistent with the objectives of the present disclosure. In some implementations, for instance, the pyroelectric material layer is a continuous or substantially continuous layer. A continuous or substantially continuous layer, in some cases, can be a layer having no substantial breaks or discontinuities between portions or segments of the layer. Thus, a continuous or substantially continuous layer can be a layer formed by a single continuous portion of pyroelectric material. Alternatively, in other instances, the pyroelectric material layer can be a tiled layer formed from one or more distinct tiles of pyroelectric material placed adjacent to one another to form the layer.

Further, in some implementations, the pyroelectric material layer of an ice detector described herein can be a crystalline layer or a substantially crystalline layer. A "crystalline" layer, for reference purposes herein, comprises a layer that has a crystalline microstructure. A crystalline or substantially crystalline layer can be single-crystalline or polycrystalline. Moreover, for reference purposes herein, a "substantially crystalline" layer can have a crystallinity of at least about 60 percent, at least about 70 percent, at least about 80 percent, at least about 90 percent, or at least about 95 percent, based on the total mass of the pyroelectric material. In some implementations, the pyroelectric material layer of an ice detector described herein is a quasi-amorphous layer. A "quasi-amorphous" layer, for reference purposes herein, comprises a layer that exhibits a pyroelectric effect and has a partially crystalline and partially amorphous microstructure.

A pyroelectric material layer of an ice detector described herein can comprise or be formed from any pyroelectric material not inconsistent with the objectives of the present disclosure. For example, in some implementations, a pyroelectric material layer is formed from an inorganic material such as a ceramic material, poled ceramic material, or semiconductor material. In some cases, a pyroelectric material layer is formed from a gallium nitride, a cesium nitrate, a lithium tantalate, a strontium titanate, a barium titanate, a barium strontium titanate, a strontium zirconate, a barium zirconate, a barium strontium zirconate, a lead zirconate, a strontium niobate, a barium niobate, a barium strontium niobate, or a combination thereof. In some cases, the pyroelectric material layer of an ice detector described herein is formed from LiTaO$_3$, SrTiO$_3$, BaTiO$_3$, (Sr$_x$Ba$_{1-x}$)TiO$_3$, SrZrO$_3$, BaZrO$_3$, (Sr$_x$Ba$_{1-x}$)ZrO$_3$, PbZrO$_3$, SrNb$_2$O$_6$, BaNb$_2$O$_6$, (Sr$_x$Ba$_{1-x}$)Nb$_2$O$_6$, Pb(Sc$_{0.5}$Ta$_{0.5}$)O$_3$, or a combination thereof, wherein 0<x<1.

In other implementations, the pyroelectric material layer comprises or is formed from an organic material such as a polymeric material. In some instances, the pyroelectric material layer comprises or is formed from a polyvinylidene fluoride (PVDF) or a polyvinylidene fluoride-trifluoroethylene (PVDF-PrTE). Further, in some implementations, the pyroelectric material layer of an ice detector described herein comprises or is formed from a composite material, such as a composite material comprising an inorganic material described hereinabove dispersed within a polymeric material described hereinabove. In some cases, for instance, the pyroelectric material layer of an ice detector described herein comprises or is formed from a composite material comprising a lithium tantalate, a strontium titanate, a barium titanate, a barium strontium titanate, a strontium zirconate, a barium zirconate, a barium strontium zirconate, a lead zirconate, a strontium niobate, a barium niobate, or a barium strontium niobate dispersed in a PVDF or PVDF-PrTE matrix.

Further, the pyroelectric material layer of an ice detector described herein can comprise or be formed from a material having any pyroelectric coefficient not inconsistent with the objectives of the present disclosure. In some implementations, the pyroelectric material layer is formed from a material having a large pyroelectric coefficient. For example, in some instances, a pyroelectric material of the pyroelectric material layer has a total pyroelectric constant of about −20 C/m²K to about −800 C/m²K, where the total pyroelectric constant (p) is determined by Equation (1):

$$p=(\Delta P_S/\Delta T) \qquad (1),$$

wherein $P_S$ is the spontaneous polarization of the pyroelectric material and T is temperature. In addition, the total pyroelectric constant p of Equation (1) is determined at constant electric field and constant elastic stress, as described, for example, in Sidney B. Lang, "Pyroelectricity: From Ancient Curiosity to Modern Imaging Tool," *Physics Today*, August 2005. "Constant elastic stress," for reference purposes herein, means that the pyroelectric material is not clamped during the measurement but is instead free to expand or contract thermally. In some implementations, the pyroelectric material used to form the pyroelectric material layer has a total pyroelectric constant of about −20 C/m²K to about −600 C/m²K, about −25 C/m²K to about −400 C/m²K, about −75 C/m²K to about −600 C/m²K, about −75 C/m²K to about −300 C/m²K, about −100 C/m²K to about −600 C/m²K, about −100 C/m²K to about −400 C/m²K, or about −100 C/m²K to about −300 C/m²K.

Moreover, a surface of the pyroelectric material layer of an ice detector described herein can be electrically charged. The charge can be a positive charge or a negative charge. Further, when charged, a surface of the pyroelectric material layer can exhibit a local freezing point of water that differs from the local freezing point of water exhibited by an uncharged surface of the pyroelectric material. Additionally, in some cases, a charged surface of the pyroelectric material layer can exhibit a local freezing point of water that differs from the local freezing point of water exhibited by the probe surface in the absence of the pyroelectric material layer. Moreover, in some implementations, a charged surface of the pyroelectric material layer can exhibit a local freezing point of water that differs from the local freezing point of water exhibited by a surface of an aircraft associated with an ice detector described herein. Such aircraft surfaces can include one or more critical flight surfaces described herein, such as one or more airfoil surfaces. In some instances, the local freezing point of water exhibited by a charged surface of the pyroelectric material layer of an ice detector described herein is higher than the local freezing point of water exhibited by a different surface described hereinabove, such as an uncharged pyroelectric material layer surface, a probe surface, and/or an aircraft surface. Alternatively, in other cases, the local freezing point of water exhibited by a charged surface of the pyroelectric material layer of an ice detector described herein is lower than the local freezing point of water exhibited by a different surface described hereinabove. A "local" freezing point of water, for reference purposes here, refers to the freezing point of water within about 10 μm, within about 5 μm, within about 1 μm, or within about 0.5 μm of a surface.

Additionally, in some cases, the increase or decrease of a local freezing point of water of a pyroelectric material layer surface described herein can be selected based on the charge of the pyroelectric material layer. For example, in some implementations, a positively charged surface of the pyroelectric material layer exhibits a local freezing point of water that is greater than the local freezing point of water exhibited by a different surface described herein, such as an aircraft surface. Moreover, the difference between the local freezing point of water of a surface of the pyroelectric material layer and the local freezing point of water of a different surface can be up to about 15° C., up to about 10° C., up to about 8° C., up to about 5° C., up to about 2° C., up to about 1° C., or up to about 0.5° C., including when the water is supercooled liquid water. In some cases, the difference between the local freezing point of water on a surface of the pyroelectric material layer and the local freezing point of water on a different surface described herein can be between about 0.1° C. and about 15° C., between about 0.5° C. and about 10° C., between about 0.5° C. and about 8° C., between about 0.5° C. and about 5° C., between about 1° C. and about 15° C., between about 1° C. and about 10° C., between about 1° C. and about 8° C., between about 1° C. and about 5° C., between about 3° C. and about 15° C., between about 3° C. and about 10° C., between about 5° C. and about 15° C., or between about 5° C. and about 10° C.

Moreover, the pyroelectic material layer of an ice detector described herein can have any thickness not inconsistent with the objectives of the present disclosure. For example, in some cases, the pyroelectic material layer has an average thickness of up to about 500 μm, up to about 100 μm, up to about 10 μm, up to about 1 μm, up to about 500 nm, or up to about 100 nm. In some implementations, the pyroelectic material layer has an average thickness of about 10 nm to about 500 μm, about 10 nm to about 500 nm, about 10 nm to about 100 nm, about 50 nm to about 500 μm, about 50 nm to about 500 nm, about 100 nm to about 100 μm, about 100 nm to about 10 μm, about 100 nm to about 1 μm, about 500 nm to about 500 μm, about 500 nm to about 100 μm, about 500 nm to about 10 μm, about 500 nm to about 1 μm, about 1 μm to about 500 μm, about 1 μm to about 100 μm, or about 1 μm to about 10 μm.

Ice detectors described herein, in some implementations, also comprise one or more additional layers disposed between the probe surface and the pyroelectric material layer of the ice detector. Any additional layers not inconsistent with the objectives of the present disclosure may be used. In some cases, an additional layer provides a desired electrical and/or thermal property. For example, in some cases, one or more additional layers is electrically conductive and/or thermally insulating. In some instances, one or more additional layers exhibits an electrical conductivity of at least about $1.0\times10^{-3}$ S/m at 20° C. or at least about $1.5\times10^{-3}$ S/m at 20° C. In some implementations, one or more additional layers exhibits a thermal diffusivity of no greater than about $10\times10^{-3}$ cm²/sec or no greater than about $5\times10^{-3}$ cm²/sec.

An additional layer disposed between the probe surface and the pyroelectric material layer of an ice detector described herein can also facilitate coupling or adhesion of the probe surface and the pyroelectric material layer to one another. For example, in some implementations, an ice detector described herein further comprises an adhesive material layer disposed between the probe surface and the pyroelectric material layer. Any adhesive material not inconsistent with the objectives of the present disclosure may be used. In some cases, the adhesive material of an adhesive material layer described herein exhibits an electrical conductivity and/or a thermal diffusivity described hereinabove. For example, in some implementations, the adhesive material of an adhesive material layer described herein exhibits an electrical conductivity of at least about $1.0\times10^{-3}$ S/m at 20° C. or at least about $1.5\times10^{-3}$ S/m at 20° C. and also exhibits a thermal diffusivity of no greater than about $10\times10^{-3}$ cm²/sec or no greater than about $5\times10^{-3}$ cm²/sec.

In addition, an adhesive material of an adhesive material layer described herein can be a fluid material or a solid material. In some implementations, an adhesive material comprises an animal protein-based adhesive material such as a collagen glue, albumin glue, casein glue, or meat glue. An adhesive material can also comprise a plant-based adhesive material such as a resin or starch. An adhesive material can also comprise a synthetic adhesive material such as a synthetic monomer glue or a synthetic polymer glue. In some implementations, an adhesive material comprises an acrylonitrile, a cyanoacrylate, or an acrylic glue or a combination thereof. In some cases, an adhesive material comprises an epoxy resin, an epoxy putty, an ethylene-vinyl acetate, a phenol formaldehyde resin, a polyamide, a polyester resin, a polyethylene hot-melt glue, a polypropylene glue, a polysulfide, a polyurethane, a polyvinyl acetate, a polyvinyl alcohol, a polyvinyl chloride, a polyvinylpyrrolidone, a rubber cement, a silicone, or a styrene acrylate copolymer, or a combination or mixture thereof. In some implementations, an adhesive material comprises Gorilla Glue or Loctite 3888.

Moreover, the one or more additional layers of an ice detector described herein, when present, can have any thickness not inconsistent with the objectives of the present disclosure. For example, in some cases, an additional layer such as an adhesive material layer can have an average thickness of up to about 1 mm, up to about 0.5 mm, or up to about 500 µm. In some implementations, an additional layer such as an adhesive material layer has an average thickness of about 500 nm to about 1 mm, about 1 µm to about 500 µm, or about 10 µm to about 500 µm.

An ice detector described herein can be made or assembled in any manner not inconsistent with the objectives of the present disclosure. For example, in some implementations, an ice detector can be made by modifying an existing ice detector such as an existing commercial ice detector, as described further hereinbelow. An existing ice detector, in some cases, can be modified by forming a pyroelectric material layer on a probe surface of the existing ice detector, the probe surface being operable to detect the formation or nucleation of ice on the probe surface, including in a manner described hereinabove. Non-limiting examples of commercial ice detectors suitable for use in some implementations described herein include Goodrich 0781LH1, Goodrich 0781ND, and Meggitt/Vibro-Meter EW-140 ice detectors.

Figure 9:
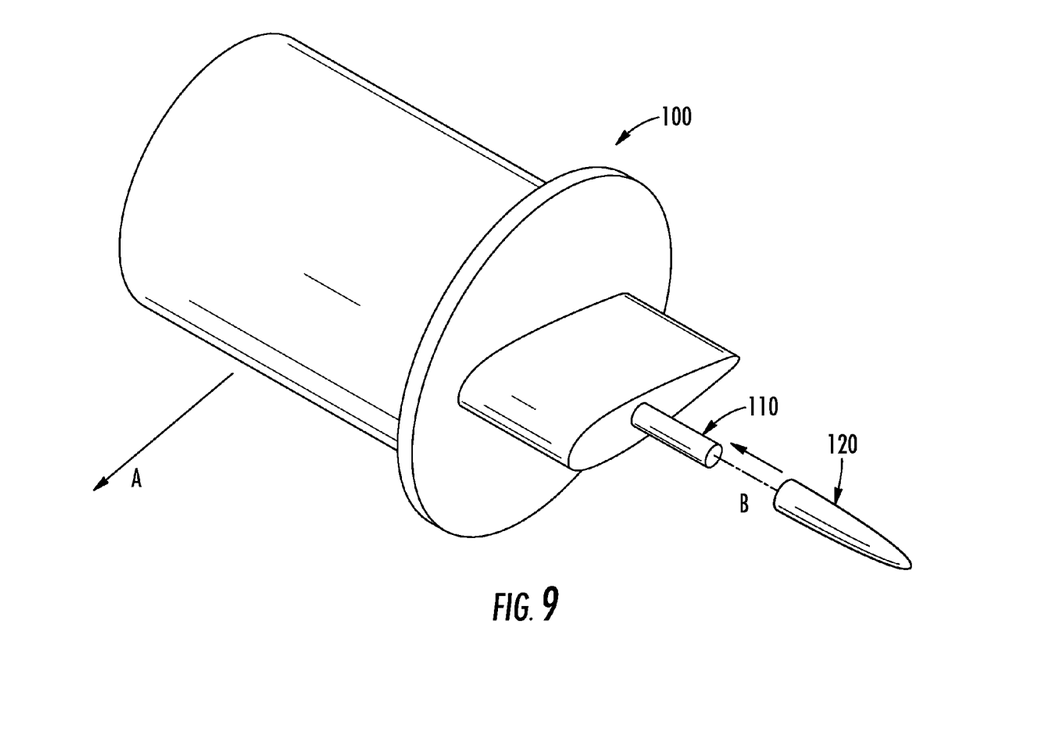
FIG. 9 illustrates a perspective view of an ice detector according to one implementation described herein.

A pyroelectric material layer can be formed or disposed on an existing probe surface in any manner not inconsistent with the objectives of the present disclosure. In some cases, for instance, a pyroelectric material layer is disposed on a probe surface by covering or "capping" at least a portion of the probe surface with a shaped "cap" of pyroelectrical material that is configured to at least partially cover the probe surface. If desired, an adhesive material can first be applied to the probe surface and/or the interior of the cap. The cap of pyroelectric material can then be applied to the probe surface. Such a method of disposing a pyroelectric material layer on a probe surface is illustrated in FIG. 9. As understood by one of ordinary skill in the art, the various elements depicted in FIG. 9 are representational and are not necessarily drawn to scale.

As illustrated in FIG. 9, an ice detector (100) comprises a probe surface (110). The probe surface (110) can be an ultrasonic vibrating probe surface, such as used in a magnetostrictive ice detector architecture described hereianbove. In addition, the ice detector (100) can be coupled to an aircraft (not shown) such that the ice detector (100) moves in direction (A) when the aircraft is in flight. However, other configurations are also possible. A pyroelectric material layer can be disposed on the probe surface (110) by sliding or fitting a cap (120) formed from a pyroelectric material over or onto the probes surface (110), as indicated by the arrow (B) in FIG. 9. The cap (120) can have any shape and dimensions not inconsistent with the objectives of the present disclosure. For example, in some cases, the cap (120) has a hollow cylindrical or conical shape. In addition, in some implementations, a hollow cap (120) can have a wall thickness of no greater than about 0.05 inches.

Moreover, if desired, an adhesive material layer (not shown) can be disposed between the cap (120) and the probe surface (110) to facilitate secure coupling of the cap (120) and the probe surface (110) and/or to provide one or more desired electrical or thermal properties, as described further hereinabove.

In addition to the method illustrated in FIG. 9, a pyroelectric material layer can also be disposed on an existing probe surface in other manners. For example, in some implementations, a probe surface is dipped or otherwise contacted with a molten pyroelectric material, such as a molten pyroelectric polymer material or a molten pyroelectric ceramic material. A pyroelectric material can also be disposed on a probe surface using a vapor or plasma deposition technique, such as a vacuum deposition, plasma sputtering, physical vapor deposition, or chemical vapor deposition technique.

Moreover, in some implementations, a pyroelectric material layer is disposed on an existing probe surface in a tiled manner. For example, in some cases, tiles formed from the pyroelectric material are disposed on the probe surface using an adhesive material, including an adhesive material described hereinabove. The tiles can have any dimensions not inconsistent with the objectives of the present disclosure. In some implementations, the dimensions of the pyroelectric material tiles are selected based on the shape and/or surface area of the probe surface, the chemical composition of the probe surface, the type of ice detector, and/or the chemical composition or pyroelectric properties of the pyroelectric material.

In general, the manner of disposing a pyroelectric material layer described herein on a probe surface can be selected based on the mechanical properties of the pyroelectric material (such as its brittleness or ability to be machined into a desired shape), the physical properties of the pyroelectric material (such as its melting point), the chemical composition of the pyroelectric material, the chemical composition of the probe surface, the morphology of the probe surface, and/or the type of ice detector.

Further, modifying an existing ice detector in a manner described herein can improve one or more performance characteristics of the ice detector. In some cases, for example, improving the performance characteristics of an ice detector comprises reducing the false negatives of the ice detector and/or increasing the range of atmospheric conditions in which the ice detector can reliably operate.

In another aspect, methods of detecting ice formation on an aircraft are described herein. In some implementations, a method of detecting ice formation on an aircraft comprises disposing an ice detector described herein on an exterior surface of the aircraft and generating a charge on a surface of the pyroelectric material layer of the ice detector to alter the local freezing point of water on the surface of the pyroelectric material layer. In some cases, generating a charge on the surface of the pyroelectric material layer increases the local freezing point of water on the surface. In other instances, generating a charge on the surface of the pyroelectric material layer decreases the local freezing point of water on the surface. Moreover, the surface can be an exterior surface of the pyroelectric material layer, including an exterior surface exposed to the external environment of the aircraft. Further, in some implementations, a charge is generated on the surface of the pyroelectric material layer while the aircraft is in flight.

In addition, in some implementations, a method described herein further comprises providing a signal in response to the formation of ice on the surface of the pyroelectric material layer of the ice detector. Further, in some cases, the local freezing point of water on the surface of the pyroelectric material layer is greater than the local freezing point of water on one or more flight surfaces of the aircraft. For example, in some instances, the local freezing point of water on the surface of the pyroelectric material layer is greater than the local freezing point of water on a wing leading edge, an empennage leading edge, or an engine inlet leading edge of the aircraft. Thus, in some implementations, a method described herein can be used to detect the presence of icing conditions prior to the formation of ice on one or more critical flight surfaces, including in real-time while the aircraft is in flight.

Turning now to specific steps of methods described herein, methods of detecting ice formation on an aircraft comprise disposing an ice detector described herein on an exterior surface or skin of the aircraft. Any ice detector described hereinabove may be used. In some implementations, for example, the ice detector is an accretion-type ice detector comprising a probe surface and a pyroelectric material layer disposed on at least a portion of the probe surface. Moreover, in some cases, the pyroelectric material layer of the ice detector is a continuous or substantially continuous layer. In other instances, the pyroelectric material layer is a tiled layer. Further, in some implementations, the pyroelectric material layer of an ice detector described herein is formed from $LiTaO_3$, $SrTiO_3$, $BaTiO_3$, $(Sr_xBa_{1-x})TiO_3$, $SrZrO_3$, $BaZrO_3$, $(Sr_xBa_{1-x})ZrO_3$, $PbZrO_3$, $SrNb_2O_6$, $BaNb_2O_6$, $(Sr_xBa_{1-x})Nb_2O_6$, $Pb(Sc_{0.5}Ta_{0.5})O_3$, or a combination thereof.

In addition, an ice detector described herein can be disposed on the exterior surface or skin of the aircraft in any location and in any manner not inconsistent with the objectives of the present disclosure. For example, in some cases, the ice detector is disposed on the exterior surface of the forward fuselage section of the aircraft. However, as understood by one of ordinary skill in the art, other configurations are also possible.

Methods described herein also comprise generating a charge on a surface of the pyroelectric material layer of the ice detector to alter the local freezing point of water on the surface of the pyroelectric material layer. A charge can be generated on the surface of the pyroelectric material layer in any manner not inconsistent with the objectives of the present disclosure. In some cases, the charge generated on the surface of the pyroelectric material layer is a positive charge. In other instances, the charge generated on the surface of the pyroelectric material layer is a negative charge. Moreover, the sign of the generated charge, in some implementations, can be selected as desired by a user based on which type of charge produces an increase in the local freezing point of water on the pyroelectrical material layer. For example, in some implementations, a positively charged surface of the pyroelectric material layer exhibits a higher local freezing point of water, and a negatively charged surface of the pyroelectric material layer exhibits a lower local freezing point of water. Thus, in such implementations, generating a charge on the surface of the pyroelectric material layer can comprise generating a positive charge to increase the local freezing point of water on the surface.

Moreover, in some cases, generating a charge on the surface of the pyroelectric material layer of an ice detector described herein comprises applying a voltage to or near the pyroelectric material layer. For example, in some instances, generating a charge on the surface of the pyroelectric material layer comprises applying a voltage to a conductive material in contact with the pyroelectric material layer, such as the probe surface of the ice detector or an electrically conductive adhesive material layer disposed between the probe surface and the pyroelectric material layer.

In other implementations, generating a charge on a surface of a pyroelectric material layer comprises contacting the surface of the pyroelectric material layer with an electric field. Any strength of electric field not inconsistent with the objectives of the present disclosure may be used. For example, in some cases, the electric field has a strength of about 1 kV/cm to about 1000 kV/cm, about 1 kV/cm to about 500 kV/cm, about 10 kV/cm to about 1000 kV/cm, about 10 kV/cm to about 500 kV/cm, about 100 kV/cm to about 1000 kV/cm, or about 100 kV/cm to about 500 kV/cm. Moreover, the electric field can be generated in any manner not inconsistent with the objectives of the present disclosure, including by applying a voltage in a manner described hereinabove.

In addition, it is also possible to generate a charge on the surface of a pyroelectric material layer by heating or cooling the pyroelectric material layer. In some cases, a pyroelectric material layer is either heated or cooled based on whether a positive or a negative charge is desired on the surface. For example, in some implementations, heating a pyroelectric material layer generates a positive charge on the surface of the layer, and cooling a pyroelectric material layer generates a negative charge on the surface of the layer. Further, heating or cooling a pyroelectric material layer can be carried out in any manner not inconsistent with the objectives of the present disclosure. In some cases, for example, heating is carried out using an electric heating element in thermal contact with the pyroelectric material layer.

A method described herein, in some cases, also comprises providing a signal in response to the formation of ice on the surface of the pyroelectric material layer of an ice detector described herein. The signal can be provided in any manner not inconsistent with the objectives of the present disclosure. In some implementations, for example, a signal is provided to the operator of the aircraft when a predetermined amount of icing has occurred on the ice detector, such as an amount of icing corresponding to a maximum amount of icing or less than a maximum amount of icing considered to be safe for flight. In other instances, a signal is provided to the operator of the aircraft when any icing occurs on the ice detector. Further, as understood by one of ordinary skill in the art, the signal can be a visual signal such as a flashing light or other display indicator, or an auditory signal such as a buzzing, beeping, chiming, or verbal signal. Other signals may also be used.

Figure 10:
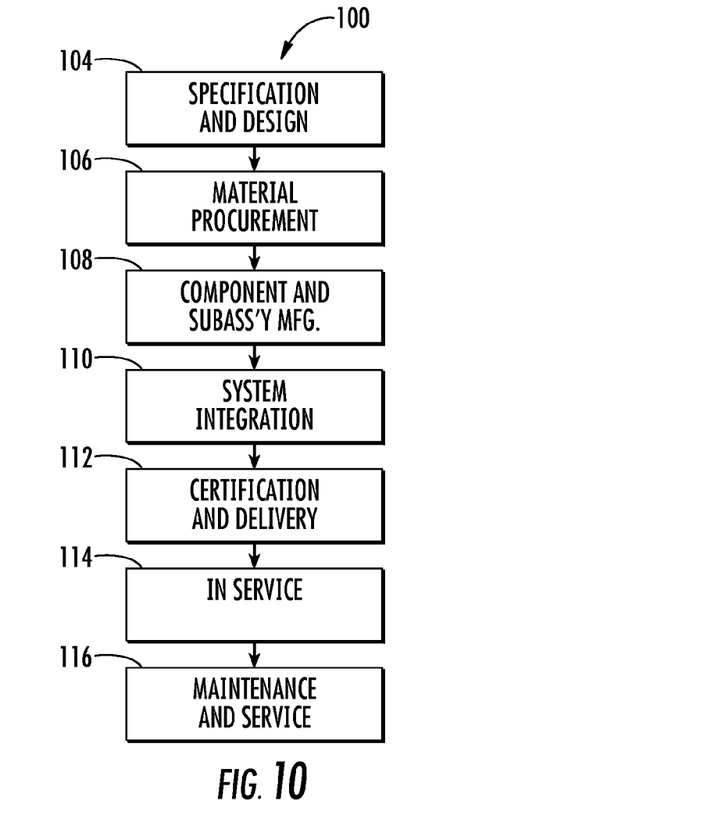
FIG. 10 illustrates a flow diagram of aircraft production and service methodology suitable for use with an ice detector according to some implementations described herein.
Figure 11:
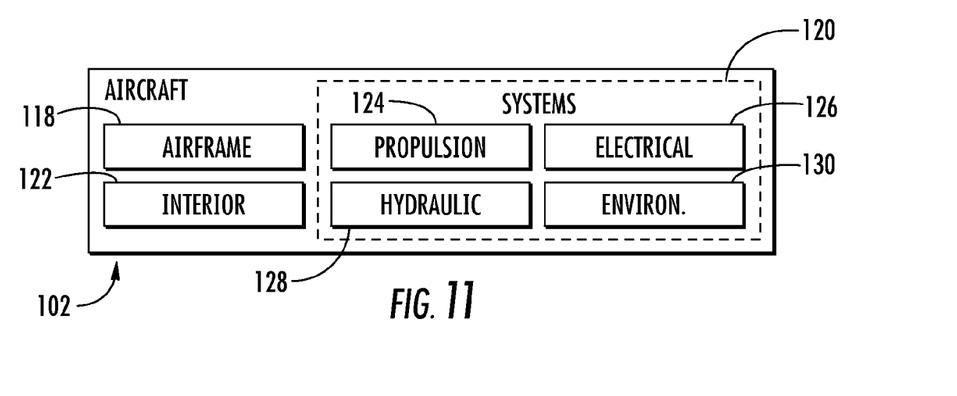
FIG. 11 illustrates a block diagram of an aircraft suitable for use with an ice detector or method according to some implementations described herein.

Referring again to the drawings, implementations of the disclosure may be described in the context of an aircraft manufacturing and service method (100), as shown in FIG. 10, and an aircraft (102) as shown in FIG. 11. During pre-production, exemplary method (100) may include specification and design (104) of the aircraft (102) and material procurement (106). During production, component and subassembly manufacturing (108) and system integration (110)

of the aircraft (102) takes place. Thereafter, the aircraft (102) may go through certification and delivery (112) in order to be placed in service (114). While in service by a customer, the aircraft (102) is scheduled for routine maintenance and service (116) (which may also include modification, reconfiguration, retrofitting, and so on).

Each of the processes of method (100) may be performed or carried out by a system integrator, a third party, and/or an operator (e.g., a customer). For the purposes of this description, a system integrator may include without limitation any number of aircraft manufacturers and major-system subcontractors; a third party may also include without limitation any number of venders, subcontractors, and suppliers; and an operator may be an airline, leasing company, military entity, service organization, and so on.

As shown in FIG. 11, the aircraft (102) produced by exemplary method (100) may include an airframe (118) with a plurality of systems (120) and an interior (122). Examples of high-level systems (120) include one or more of a propulsion system (124), an electrical system (126), a hydraulic system (128), and an environmental system (130). Any number of other systems may also be included. Although an aerospace example is shown, the principles of the disclosure may be applied to other industries, such as the automotive industry.

Apparatus and methods described herein may be employed during any one or more of the stages of the production and service method (100). For example, one or more ice detectors described herein may be utilized during the component and subassembly manufacturing stage (108), including to substantially improve the performance of the aircraft (102). In addition, one or more ice detectors or methods described herein may be utilized while the aircraft (102) is in service (114). Similarly, one or more ice detectors described herein may be used during the maintenance and service stage (116), including to repair and/or efficiently retrofit the aircraft (102) to improve the safety of the aircraft (102) without the need for substantial redesign or reconfiguration of the aircraft (102).

Some implementations described herein are further illustrated in the following non-limiting example.

EXAMPLE

Ice Detector

An ice detector according to one implementation described herein is assembled as follows. First, a commercial magnetostrictive ice detector is obtained. For example, the ice detector can be a Goodrich 0781LH1, Goodrich 0781ND, or Meggitt/Vibro-Meter EW-140 ice detector. The ice detector includes an ultrasonic vibrating probe. Next, a block of $LiTaO_3$ is machined into the shape of a hollow, substantially conical or cylindrical cap, as illustrated in FIG. 9. The cap of $LiTaO_3$ has a maximum wall thickness of 0.05 inches, a height of 1.05 inches, and an outer diameter of 0.35 inches.

Prior to use, the $LiTaO_3$ cap is cleaned by placing the cap in an ultra-sonic bath of toluene for 4 minutes. Following sonication in toluene, the cap is placed in an ultra-sonic bath of water for 4 minutes. Next, the cap is treated in a plasma asher for 30 minutes (34% Ar, 66% $O_2$, 250 Watts, 0.5 mbar). Finally, the cap is placed in a desiccator for approximately 4 hours.

To assemble the ice detector, a thin layer of adhesive is applied to the entire surface area of the probe of the magnetostrictive ice detector. The adhesive has a thermal diffusivity of less than about $5 \times 10^{-3}$ cm$^2$/sec and an electrical conductivity of at least about $1.5 \times 10^{-3}$ S/m at 20° C. The $LiTaO_3$ cap is then carefully pressed onto the probe by a user wearing latex gloves or in some other manner that avoids human skin contact with the apparatus during assembly. The cap is pressed onto the probe in a manner to provide a flush fit of the cap with the strut surface or other supporting surface upon which the probe is mounted. Any excess adhesive pressed out of the open end of the cap is then removed by wiping.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

That which is claimed is:

1. A method of detecting ice formation on an aircraft comprising:
    disposing an ice detector on an exterior surface of the aircraft, the ice detector comprising a probe surface and a pyroelectric material layer disposed on at least a portion of the probe surface; and
    generating a charge on a surface of the pyroelectric material layer to increase the local freezing point of water on the surface of the pyroelectric material layer.

2. The method of claim 1 further comprising providing a signal in response to the formation of ice on the surface of the pyroelectric material layer.

3. The method of claim 1, wherein the ice detector is disposed on the exterior surface of the forward fuselage section of the aircraft.

4. The method of claim 1, wherein the ice detector is an accretion-type ice detector.

5. The method of claim 1, wherein the pyroelectric material layer is a continuous or substantially continuous layer.

6. The method of claim 1, wherein the pyroelectric material layer is a tiled layer.

7. The method of claim 1, wherein the pyroelectric material layer is formed from $LiTaO_3$, $SrTiO_3$, $BaTiO_3$, $(Sr_xBa_{1-x})TiO_3$, $SrZrO_3$, $BaZrO_3$, $(Sr_xBa_{1-x})ZrO_3$, $PbZrO_3$, $SrNb_2O_6$, $BaNb_2O_6$, $(Sr_xBa_{1-x})Nb_2O_6$, $Pb(Sc_{0.5}Ta_{0.5})O_3$, or a combination thereof.

8. The method of claim 1, wherein the local freezing point of water on the surface of the pyroelectric material layer is greater than the local freezing point of water on one or more aircraft flight surfaces.

9. The method of claim 8, wherein the one or more aircraft flight surfaces comprise a wing leading edge, an empennage leading edge, or an engine inlet leading edge.

10. The method of claim 1, wherein the charge generated on the surface of the pyroelectric material layer is a positive charge.

11. An ice detector comprising:
    a probe surface; and
    a pyroelectric material layer disposed on at least a portion of the probe surface, wherein the surface of the pyroelectric material layer is configured, when charged, to exhibit a local freezing point of water that is greater than a local freezing point of water exhibited by the probe surface in the absence of the pyroelectric material layer.

12. The detector of claim 11 further comprising an adhesive material layer disposed between the probe surface and the pyroelectric material layer.

13. The detector of claim 11, wherein the ice detector is an accretion-type ice detector.

14. The detector of claim 11, wherein the probe surface is part of a magnetostrictive detector architecture.

15. The detector of claim 11, wherein the pyroelectric material layer is formed from $LiTaO_3$, $SrTiO_3$, $BaTiO_3$, $(Sr_xBa_{1-x})TiO_3$, $SrZrO_3$, $BaZrO_3$, $(Sr_xBa_{1-x})ZrO_3$, $PbZrO_3$, $SrNb_2O_6$, $BaNb_2O_6$, $(Sr_xBa_{1-x})Nb_2O_6$, $Pb(Sc_{0.5}Ta_{0.5})O_3$, or a combination thereof.

16. The detector of claim 11, wherein the pyroelectric material layer is positively charged.

17. The method of claim 1, wherein the probe surface exhibits an electrical conductivity of at least $1.0 \times 10^{-3}$ S/m at 20° C. and a thermal diffusivity of no greater than $10 \times 10^{-3}$ cm$^2$/sec.

18. The method of claim 1, wherein a pyroelectric material of the pyroelectric material layer has a total pyroelectric constant of $-20$ C/m$^2$K to $-800$ C/m$^2$K.

19. The method of claim 1, wherein the local freezing point of water on the surface of the pyroelectric material layer when positively charged is greater than a local freezing point of water exhibited by an aircraft flight surface by between 3° C. and 15° C.

20. The method of claim 1, wherein the charge on the surface of the pyroelectric material layer is generated while the aircraft is in flight.

\* \* \* \* \*